United States Patent [19]
Bryzek

[11] 4,414,853
[45] Nov. 15, 1983

[54] PRESSURE TRANSMITTER EMPLOYING NON-LINEAR TEMPERATURE COMPENSATION

[75] Inventor: Janusz Bryzek, Santa Clara, Calif.

[73] Assignee: The Foxboro Company, Foxboro, Mass.

[21] Appl. No.: 291,665

[22] Filed: Aug. 10, 1981

[51] Int. Cl.³ .................... G01B 7/18; G08C 19/04; G08C 25/02
[52] U.S. Cl. .................. 73/766; 340/870.17; 340/870.38; 340/870.42; 374/143; 374/173
[58] Field of Search .............. 340/870.42, 870.43, 340/870.39, 870.38, 870.17; 324/62; 73/765, 766; 374/143, 173, 183

[56] References Cited
U.S. PATENT DOCUMENTS

| | | | |
|---|---|---|---|
| 3,841,150 | 10/1974 | Pearson | 73/766 |
| 4,000,643 | 1/1977 | Pearson | 73/766 |
| 4,202,218 | 5/1980 | Romo | 73/766 |
| 4,337,665 | 7/1982 | Sato et al. | 73/766 |

Primary Examiner—James J. Groody
Attorney, Agent, or Firm—Jack H. Wu; Ronald J. Paglierani

[57] ABSTRACT

A pressure transmitter is provided for producing a voltage signal representative of the magnitude of pressure being applied to a diaphragm of the transmitter, wherein a network including strain-sensitive resistors that are formed in the diaphragm is coupled to the output of a constant-current power supply for producing the voltage signal in response to the strain generated by the applied pressure in the diaphragm and a feedback circuit operates in a non-linear manner for generating a control signal in response to a temperature signal produced by the network. The power supply coupled to receive the control signal is responsive thereto for changing the current supplied to the network so that compensation is thereby provided for errors in the pressure measurement caused by changes in the temperature of the network resistors.

20 Claims, 21 Drawing Figures

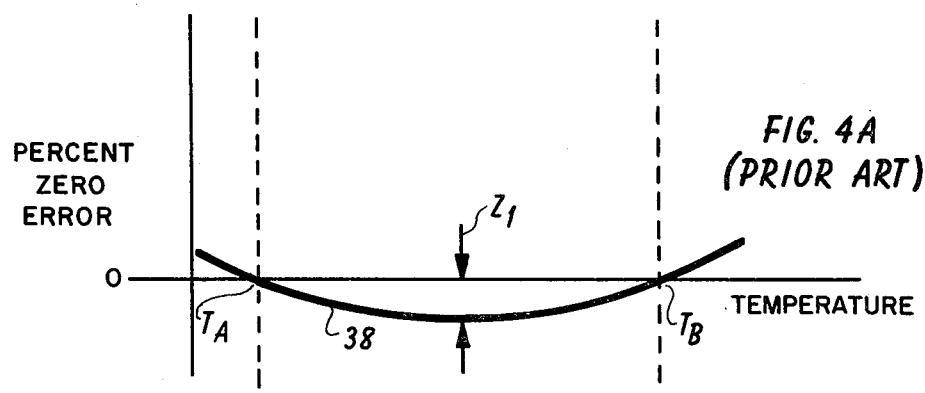
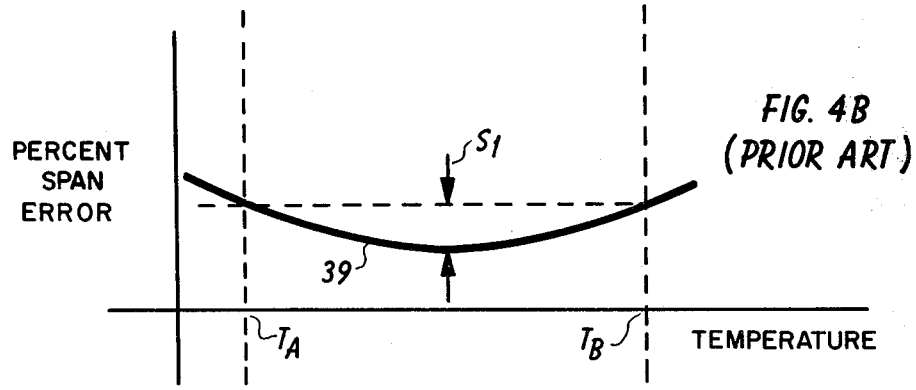

4,414,853

PRESSURE TRANSMITTER EMPLOYING NON-LINEAR TEMPERATURE COMPENSATION

BACKGROUND OF THE INVENTION

1. Field of the Invention

This invention relates to electronic pressure transmitters having semiconductor strain-gauge type pressure sensors, and more particularly to a circuit which operates to compensate for pressure measurement errors created by temperature.

2. Description of the Prior Art

A semiconductor pressure transmitter typically includes a pressure sensor comprising piezoresistive elements diffused into a silicon diaphragm. The operation of the transmitter is such that a pressure differential develops a strain in the silicon diaphragm which strain produces a change in the resistance of the piezoresistive elements. If a pair of piezoresistive elements are diffused orthogonally with respect to one another in the silicon diaphragm, the pressure differential when applied across the diaphragm causes the resistance of one piezoresistive element to increase an amount and the other to decrease by an equal amount. In other words, a transversely oriented piezoresistive element when subjected to a strain changes its resistance by an amount equal in magnitude but opposite in sign to the change in resistance resulting from the application of the same strain to a longitudinally oriented element.

With reference to the drawings appended in this application, Wheatstone bridge 10 shown in FIG. 1 is a pressure sensor circuit typically used in semiconductor pressure transmitters of the prior art. Piezoresistive elements $R_1$ through $R_4$ are diffused into a silicon diaphragm (not shown). If bridge 10 is connected to a constant current source (not shown) which produces current I and is then subjected to a strain, the resistances of elements $R_1$ through $R_4$ will individually change so that a voltage $V_O$ measured at terminal nodes 20 and 22 will change. Bridge voltage $V_B$ measured at nodes 12 and 14 will remain essentially unchanged because elements $R_1$ through $R_4$ are orthogonally arranged so that the resistance change of one resistor is compensated by the resistance change of another resistor. Since voltage $V_O$ varies in direct relation to the strain being applied to bridge 10, it is useful as a measure of the magnitude of the pressure differential being applied to the diaphragm. However, as is well known, the resistance of elements $R_1$ through $R_4$ are temperature dependent. Line 30 in FIG. 2A is a typical plot of the changes in bridge voltage $V_B$ as a function of temperature and with constant bridge current. For a specific pressure transmitter, bridge voltage $V_B$ may vary, for example, as much as 30 percent of the entire voltage range for a 100° C. change in temperature.

Two measures of temperature performances of pressure transmitters are zero error and span error. As further explanation, zero error refers to the percent change in voltage $V_O$ with respect to the voltage produced at a prescribed temperature $T_{Ref}$ and under the conditions of zero pressure differential acting on the diaphragm. With reference to line 32 shown in FIG. 2B, percent zero error is the voltage change expressed as a percent of the voltage occurring at temperature $T_{Ref}$. Span is the difference between the maximum and minimum values of a prescribed range of pressures over which the pressure transmitter is designed to measure. With reference to line 34 shown in FIG. 2C, percent span error is the difference, expressed as a percent of a reference (or prescribed) span, between the actual span and the reference span. It should be noted that the direction of change of the zero and span errors are not related to one another. In other words, zero error may vary negatively or positively as depicted by lines 32 and 33 respectively and span error may vary positively or negatively as depicted by lines 34 and 35 respectively.

In FIGS. 3 and 4A-B there are shown respectively a prior typical art pressure sensor circuit which includes resistors to compensate for zero errors as well as span errors and graphs depicting the corresponding percent zero and percent span errors. To compensate for zero error, such as depicted by line 32 shown in FIG. 2B, series resistor $R_S$ and parallel resistor $R_P$ are included in the pressure sensor circuit so that percent zero error line 38 (shown in FIG. 4A) crosses the zero percent line at two specified temperatures $T_A$ and $T_B$, that may be the end points of the temperature range in which the pressure sensor circuit is designed to operate. Resistors $R_S$ and $R_P$ are temperature stable, that is, their resistances do not vary over the temperature range between $T_A$ and $T_B$.

The specific resistance values for $R_S$ and $R_P$ may be determined by first measuring empirically the actual zero error at the two prescribed temperatures $T_A$ and $T_B$ for the pressure sensor circuit comprising only $R_1$ through $R_4$ in a bridge arrangement and second using circuit analysis techniques, which are well known in the art, for the series and parallel connections of resistors $R_S$ and $R_P$ to determine the required resistance values for eliminating the two empirically measured errors.

It should be noted that resistors $R_1$ through $R_4$ of sensor 40 are not orthogonally arranged with one another but are positioned in a bridge configuration in the diaphragm so that a pressure differential when applied to the diaphragm places two of the four resistors in compression and the remaining two resistors in tension. Accordingly, two piezoresistive elements increase in resistance and two other piezoresistive elements decrease in resistance.

In addition, it should be recalled that in FIG. 2B the percent zero error line may vary positively or negatively. As a result, resistor $R_S$ may be located between nodes 24 and 25 and a short connected between nodes 23 and 24 (or vice versa as required) and resistor $R_P$ may be connected between nodes 28 and 29 and nodes 26 and 27 left open therebetween (or vice versa as required) to compensate for the percent zero error.

In order to compensate for span errors, such as shown by line 34 in FIG. 2C, temperature-stable resistor $R_{SPAN}$ is connected across nodes 12 and 14 where bridge voltage $V_B$ appears. Using a two-step process similar to that described above for determining the values of resistors $R_S$ and $R_P$, the value of $R_{SPAN}$ may be found such that percent span error line 39 shown in FIG. 4B crosses the two prescribed temperature points $T_A$ and $T_B$ with the same span error percentage.

It will be recalled that two temperature-stable resistors were used to compensate for zero error. Although only one resistor is required to equalize the zero errors at temperatures $T_A$ and $T_B$, a second resistor is used because of the additional requirement of offsetting any voltage produced at those temperatures when there is no pressure differential. This additional requirement is not needed for span error correction because the actual span does not have to equal the reference span. In other words, if the actual span is an acceptable range, then it is only important that the span does not change at the two prescribed temperatures so that span errors occurring therebetween are substantially reduced.

It should be understood from the above that the passive resistance circuits for correcting zero and span errors are characterized by continuous and smooth transfer functions and do not fully compensate for the errors occurring at temperatures intermediate $T_A$ and $T_B$ because such errors are non-linearly dependent upon temperature. In process control applications, there is a need to reduce further the errors produced by the above described pressure sensors so that pressure measurements are made with increased accuracy.

U.S. Pat. No. 4,202,218, issued to Romo on May 13, 1980, discloses another means for temperature compensation wherein active electronic components are included with the above described passive resistive circuits. The output of the pressure sensor circuit is fed back to change the output of a constant current power supply in an effort to compensate for the changes in resistance caused by temperature so that zero and span errors are thereby reduced. However, the transfer functions describing the characteristic performances of the components used in the temperature compensation circuits are all continuous and linear functions over the prescribed temperature range. Accordingly, the reductions in the percent of zero and span errors are necessarily limited because of the non-linear relationship of zero and span errors with temperature.

Still another means of compensating for zero and span temperature errors is disclosed in the IEEE Transactions on Electron Devices, Volume ED-16, No. 10, dated October 1969, in the article on pages 870–876 entitled "Solid State Digital Pressure Transducer." That article teaches the use of separate pressure and temperature sensors which produce information combined in accordance with a complex computer algorithm so that the existing pressure can be calculated with great accuracy. However, such means is necessarily costly and use of a computer program and associated hardware introduces complexities which may be deleterious to the reliability of the pressure transmitter.

Therefore, there is a need for improvement in the means for providing temperature compensation for zero and span errors of pressure transmitters.

SUMMARY OF THE INVENTION

The limitations of the above-described prior art pressure transmitters are overcome by a pressure transmitter made in accordance with the principles of the present invention. Briefly described the preferred embodiment of the present invention includes a resistive type strain gauge pressure sensor for producing a voltage signal representative of the magnitude of pressure being applied to the sensor. A constant current power supply being coupled to the pressure sensor operates to insure that a constant current is supplied to the sensor, and a feedback circuit for responding in a non-linear manner to a temperature signal received from the sensor produces a control signal which is transmitted to the power supply. The power supply responds to the control signal by changing the current being supplied to the sensor and thereby compensates for errors in the pressure measurement caused by temperature. The transfer function describing the operation of the feedback circuit is discontinuous so that a piecewise approximation of the an ideal correction function is produced to compensate for the non-linear behavior of the pressure sensor with temperature. The feature of a discontinuous transfer function permits the pressure transmitter made in accordance with the teachings of the present invention to provide temperature compensation with greater accuracy than for prior art circuits characterized by continuous transfer functions. The present invention, therefore, overcomes the problems discussed above for prior art temperature compensation circuits.

Additionally, the present invention does not require an algorithm nor the associated computer to determine each pressure measurement and thereby overcomes the problems discussed previously for the approach disclosed in the IEEE reference.

Finally, the above described and other features of the present invention will be more fully understood from a reading of the ensuing description of the preferred embodiment given with reference to the appended drawings.

DESCRIPTION OF THE DRAWINGS

FIGS. 4A and 4B present plots of zero error and span error variations with temperature for the circuit shown in FIG. 3.

DESCRIPTION OF THE PREFERRED EMBODIMENT

Figure 1:
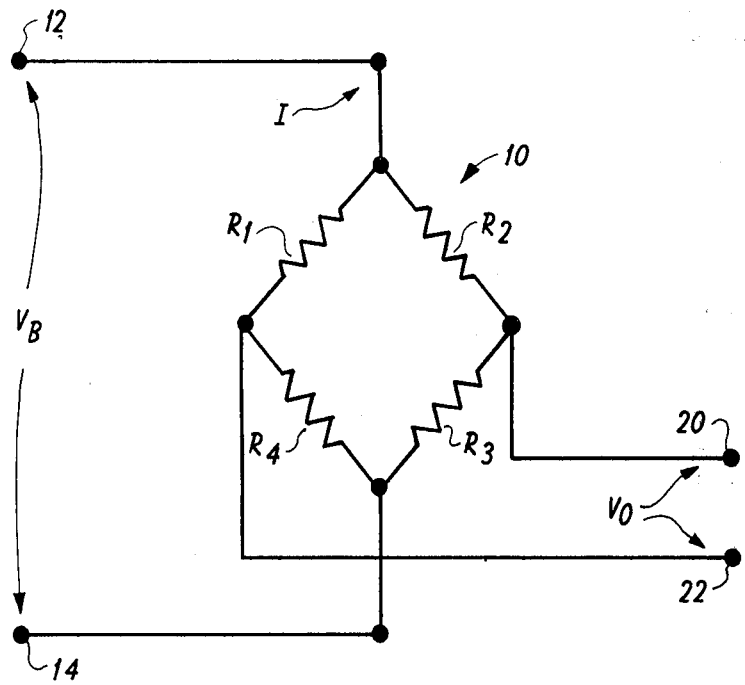
FIG. 1 is an electrical schematic of a prior art pressure sensor circuit wherein the strain resistive elements are arranged in a Wheatstone bridge configuration.
Figure 2A:
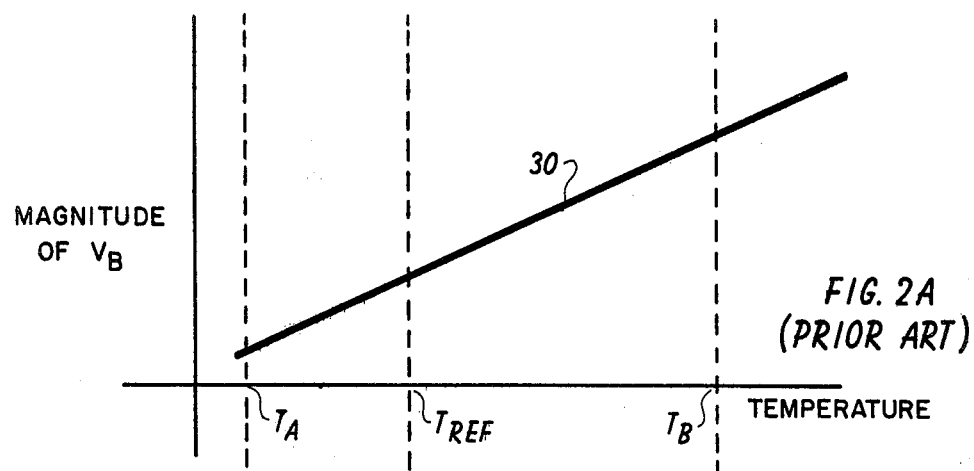
FIGS. 2A–2C depict typical plots for the pressure sensor circuit shown in FIG. 1 of bridge voltage, zero variations and span variations with respect to temperature.
Figure 2B:
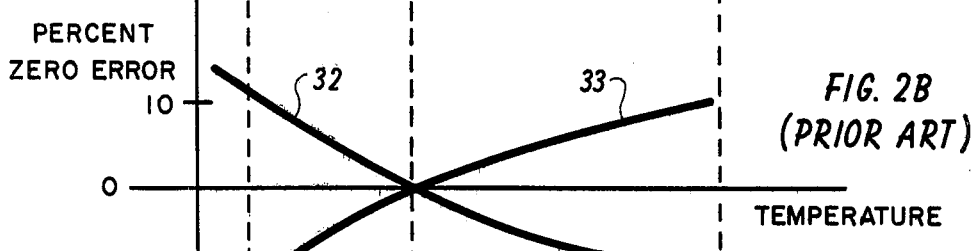
Figure 2C:
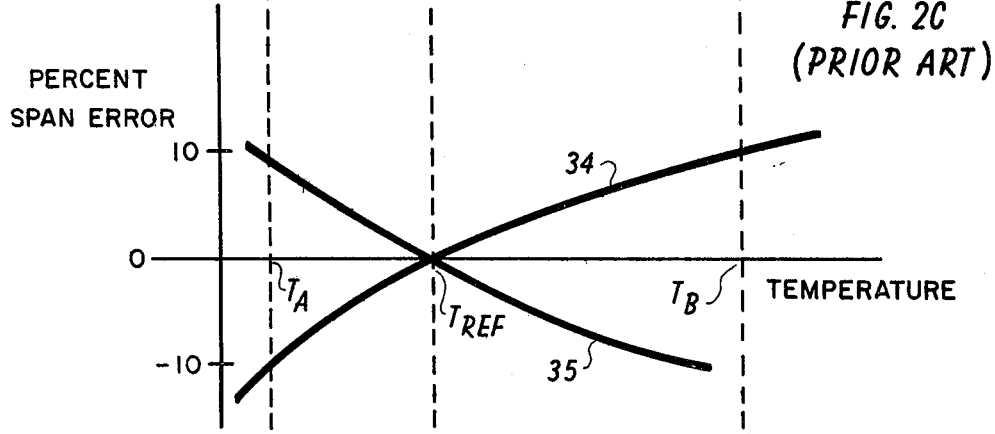
Figure 3:
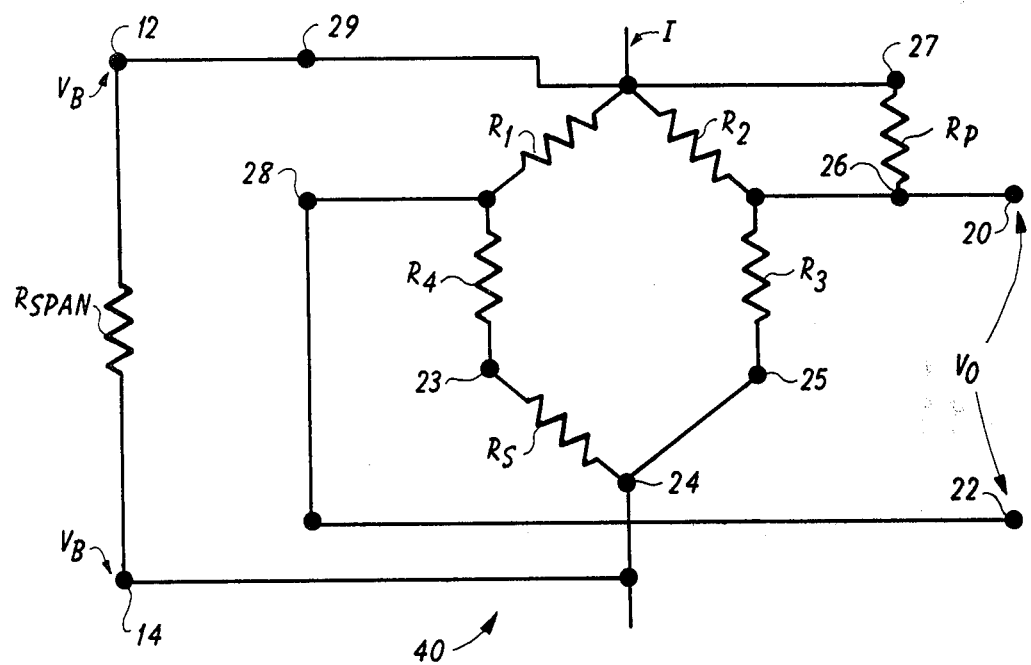
FIG. 3 is an electrical schematic including a prior art resistive circuit which is connected to a pressure sensor circuit.
Figure 5:
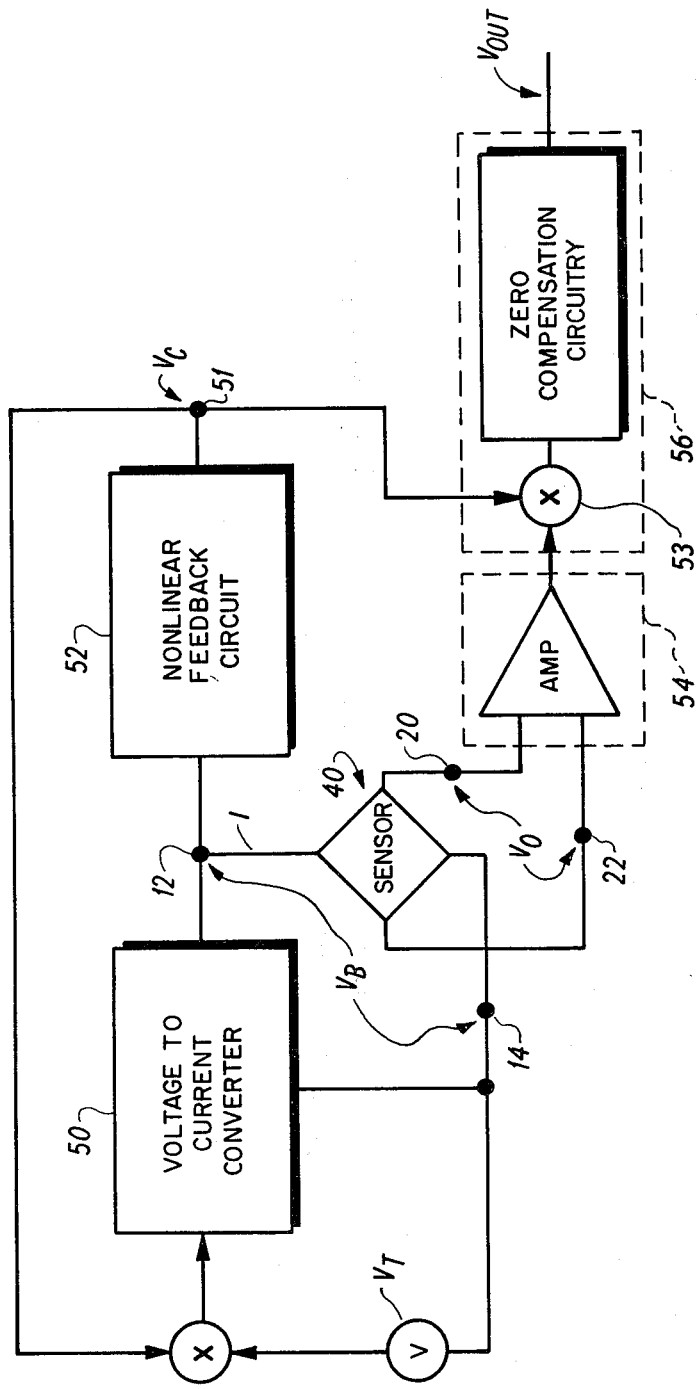
FIG. 5 is a block diagram of a pressure transmitter made in accordance with the principles of the present invention.

FIG. 5 depicts a block diagram of a pressure transmitter embodiment of the present invention. Voltage-to-current converter 50 and voltage source $V_T$ combine to operate as a constant current power supply which is coupled to a resistance bridge type pressure sensor 40. Bridge voltage $V_B$ appearing at output nodes 12 and 14 is constant in magnitude as long as current I is maintained at a constant value. However, if the resistive elements of sensor 40 are temperature sensitive (that is, their resistances are a function of temperature) bridge voltage $V_B$ will also be temperature dependent. Bridge voltage $V_B$ is therefore useful as a measure of the temperature of the resistive elements of sensor 40. Non-linear feedback circuit 52 coupled to node 12 is responsive to bridge voltage $V_B$ for producing a control voltage $V_C$ at node 51. A detailed description of circuit 52 will be presented in a subsequent portion of this discussion. Control voltage $V_C$ is fed back and combined with the output from voltage supply $V_T$ and the resulting voltage is applied to converter 50 so as to change the magnitude of current I and thereby compensate for span errors generated temperature changes in sensor 40.

When a pressure differential is applied to sensor 40 and produces a strain therein, a bridge output voltage $V_O$ appearing at nodes 20 and 22 is useful as a measure of the pressure differential. Amplifier 54 is coupled to nodes 20 and 22 to boost the signal therefrom. Zero compensation circuit 56 includes summing junction 53, which is coupled to receive the output from amplifier 54 and control voltage $V_C$, and zero compensation circuitry which is coupled to receive the output from the summing junction for producing transmitter signal $V_{OUT}$ that has zero errors substantially independent of temperature changes in the sensor. Detailed schematics of the function blocks shown in FIG. 5 will be provided in connection with the following discussions relating to the subsequent figures.

Figure 6A:
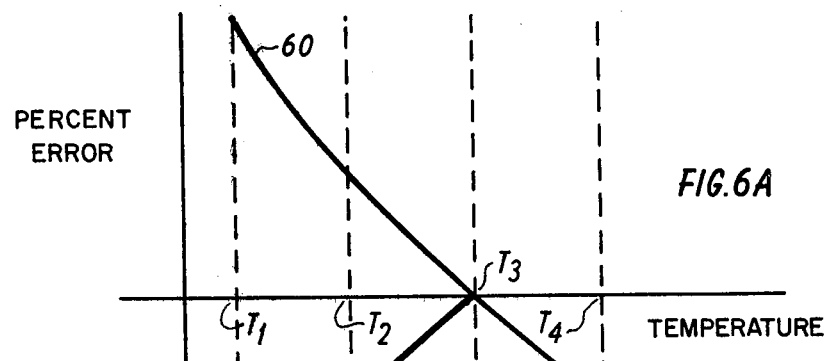
FIGS. 6A and 6B are graphs which are useful for explaining and understanding the operation of the non-linear feedback circuit portion of the present invention.
Figure 6B:
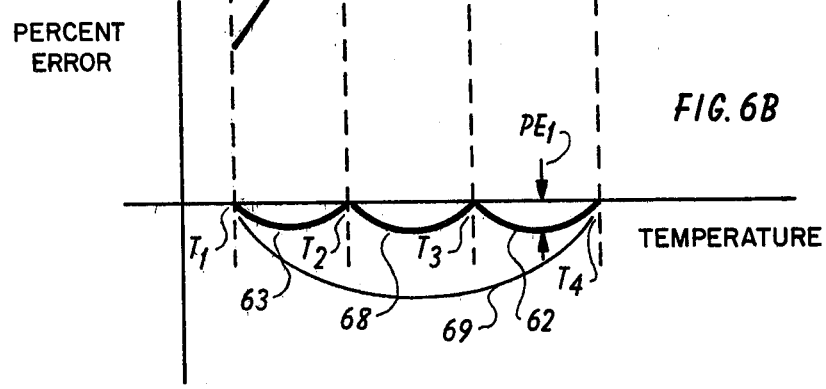

With reference to FIGS. 6A-6B, curve 60 is a typical plot of the relationship between error (which for the present discussion may be either zero or span error) and temperature. Curve 60 is representative of the temperature behavior of bridge sensor 40 (shown in FIG. 5) if no temperature compensation circuits were included. In the preferred embodiment of the present invention, bridge sensor 40 includes the above-described prior art resistive circuit comprising temperature stable resistors that are used to compensate for temperature produced errors occurring in the region between temperatures $T_3$ to $T_4$. Accordingly, for that temperature region curve 62 (in FIG. 6B) is the resulting error curve after such temperature compensation is included. It should be understood that if the interval between $T_3$ and $T_4$ is less than the interval between $T_A$ and $T_B$ (shown in FIGS. 4A or 4B) the maximum error $PE_1$ (shown in FIG. 6B) will be less than either $Z_1$ or $S_1$ (shown in FIGS. 4A and 4B respectively). As further explanation, whenever the temperature interval becomes substantially smaller, the portion of error curve 60 in such smaller interval becomes relatively more linear so that the temperature compensation resulting from the operation of the prior art resistive circuit discussed previously is substantially improved and the maximum value of error is thereby reduced with respect to that value for a larger temperature interval.

In the present invention, non-linear feedback circuit 52 (shown in FIG. 5) includes two feedback circuits. Lines 65 and 67 (in FIG. 6A) represent the errors that are contributed by the two feedback circuits to compensate for errors produced by bridge sensor 40 in the temperature interval between $T_1$ and $T_3$. Curves 63 and 68 depict the errors resulting when non-linear feedback circuit 52 is combined with bridge sensor 40. If only the prior art resistive circuit is used for the entire interval between $T_1$ and $T_4$ and non-linear feedback circuit 52 excluded, the resulting percent error curve 69 will have a maximum error that is at least an order of magnitude larger than those for the present invention. Of course, three or more feedback circuits may also be used for temperature compensation. However, additional feedback circuits introduce circuit complexities in actual implementation. A trade-off therefore exists between the added circuit complexities (along with the attendant problems of cost and reliability) and the improvement in percent error reduction.

Figure 7:
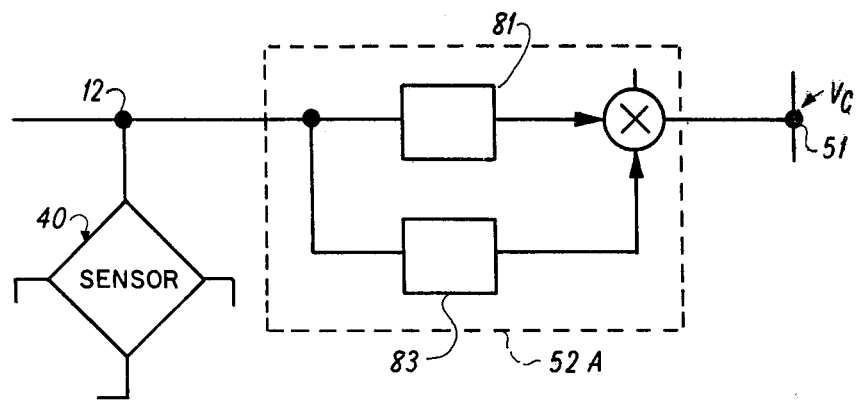
FIG. 7 depicts one embodiment of the non-linear feedback circuit block shown in FIG. 5 wherein two feedback circuits are connected in a parallel arrangement.
Figure 8:
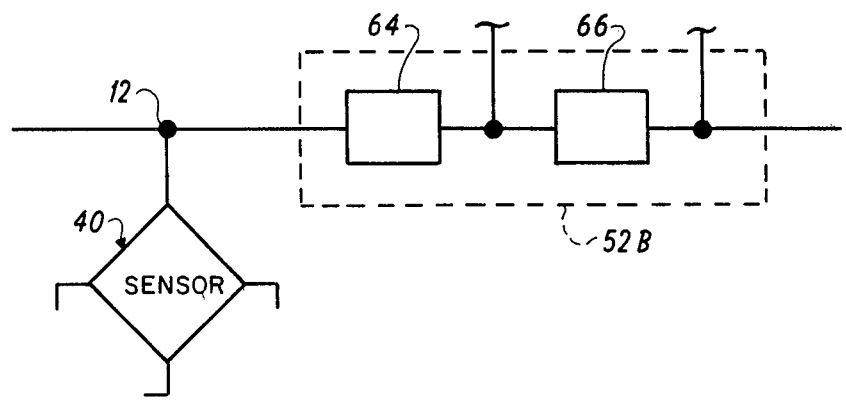
FIG. 8 depicts the preferred embodiment of the non-linear feedback circuit block shown in FIG. 5 wherein the feedback circuits are connected in a series arrangement.

With reference to FIGS. 7 and 8, non-linear feedback circuit 52A includes two feedback circuits 81 and 83 connected in parallel which operate together to produce curves 65 and 67 (shown in FIG. 6A). The two parallel connected feedback circuits permit the compensation for the errors generated by bridge sensor 40 with greater accuracy than if only one feedback circuit were used in the temperature region between $T_1$ and $T_3$. Curves 65 and 67 can also be produced by using feedback circuits 64 and 66 (shown in FIG. 8) which are connected in series with one another in non-linear feedback circuit 52B. As will be explained later, FIG. 8 is the preferred embodiment for the two feedback circuits of the non-linear feedback circuit.

Figure 9:
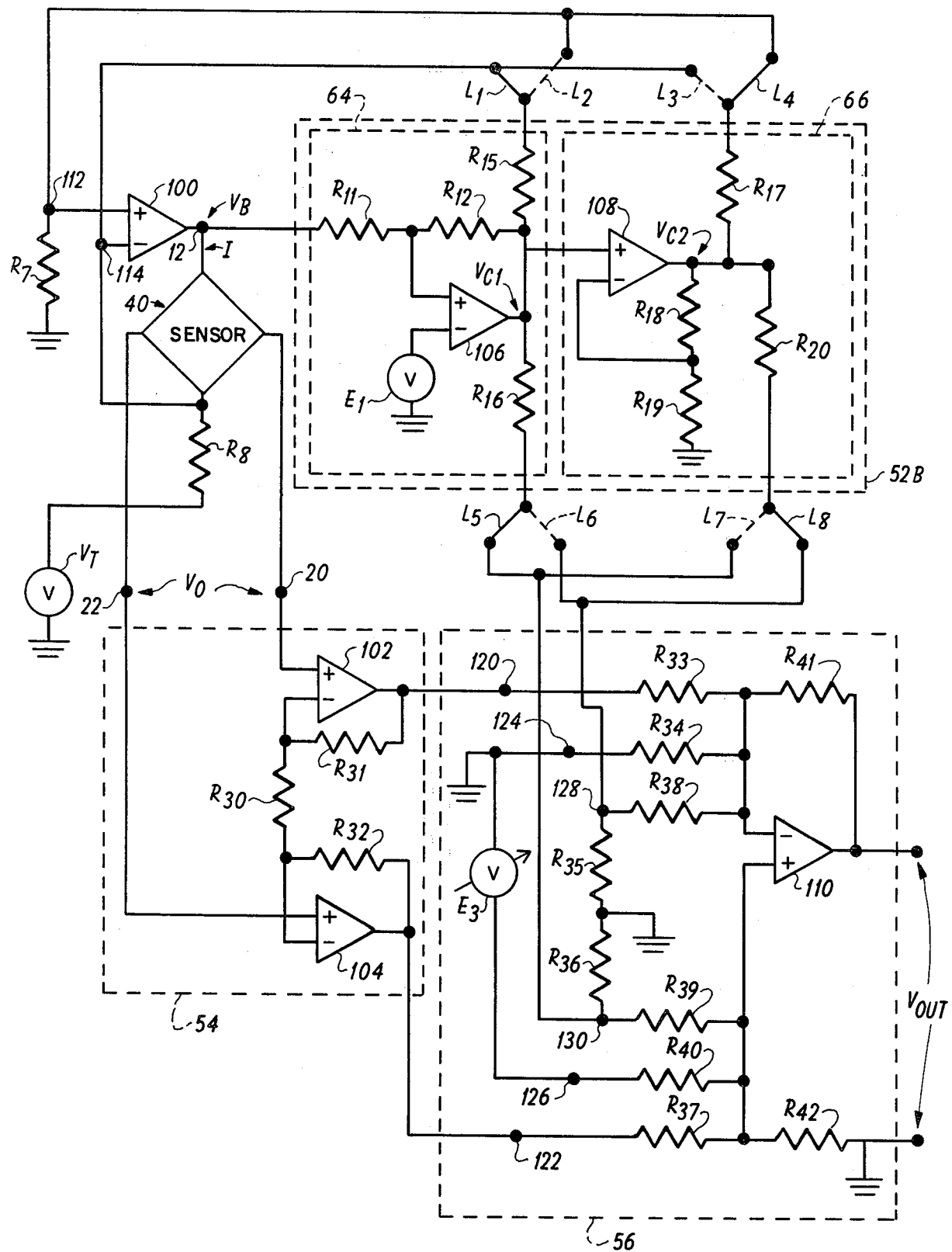
FIG. 9 is an electrical schematic of the pressure transmitter shown in FIG. 5.

FIG. 9 is an electrical schematic of the preferred embodiment of the present invention. Bridge sensor 40 includes the prior art resistive circuit (which is not shown for ease of illustration). The bridge sensor is supplied with constant current I which is controlled by operational amplifier 100. Amplifier 100 together with resistor $R_8$ and voltage source $V_T$ comprise a constant current power supply. Bridge output voltage $V_O$ appearing at nodes 20 and 22 is applied to the input of amplifier circuit 54 which includes operational amplifiers 102 and 104 that are coupled with resistors $R_{30}$, $R_{31}$ and $R_{32}$ in a configuration which has the features of common mode rejection.

Zero compensation circuit 56 is coupled to receive the output from amplifier circuit 54 and operates to generate transmitter signal $V_{out}$. It should be understood that transmitter signal $V_{out}$ is representative of the magnitude of the pressure differential being applied to sensor 40. The zero compensation circuit includes operational amplifier 110, variable voltage source $E_3$ and a resistive network comprising $R_{33}$ through $R_{42}$. Operational amplifier 110 is arranged to operate as a summing amplifier wherein the inverting and non-inverting inputs thereof are connected to elements $R_{33}$ through $R_{42}$. Nodes 120 and 122 of circuit 56 are coupled to receive the signal which is produced by amplifier circuit 54 from bridge output voltage $V_O$. Nodes 124 and 126 are connected to the outputs of variable voltage source $E_3$ and a ground reference. As is well known in the art, source $E_3$ is adjusted so as to offset any undesirable d-c bias voltage existing in the differential signals being applied to operational amplifier 110. Nodes 128 and 130 are connected to feedback circuits 64 and 66 respectively of non-linear feedback circuit 52B.

Two feedback circuits 64 and 66 are connected in series with one another. It will be recalled that such arrangement is preferred over a parallel connection arrangement. The preferred arrangement has the advantage of simplicity because only one voltage source $E_1$ is used as a source of reference voltage. A parallel connection arrangement requires two reference voltage sources which would introduce the problems associated with insuring that the voltage sources are equal in magnitude.

The graphs depicted in FIGS. 10A through 10F are illustrative for explaining and understanding the operation of the circuit shown in FIG. 9. The ensuing discussions will begin with span error compensation and will then proceed to zero error compensation. Line 31 is a plot of bridge voltage $V_B$ versus temperature for sensor 40 operating without any temperature compensation and with zero pressure differential. Curve 61 is the associated span error curve that is illustrative for such sensor. The operating temperature prescribed for the illustrative pressure transmitter of the present invention is between temperatures $T_1$ and $T_4$. It should be recalled that the prior art resistive circuit included with sensor 40 operates to compensate for the span errors occurring in the interval between temperatures $T_3$ and $T_4$. For that temperature interval curve 71 (in FIG. 10B) is the span error curve resulting from such compensation.

Figure 10A:
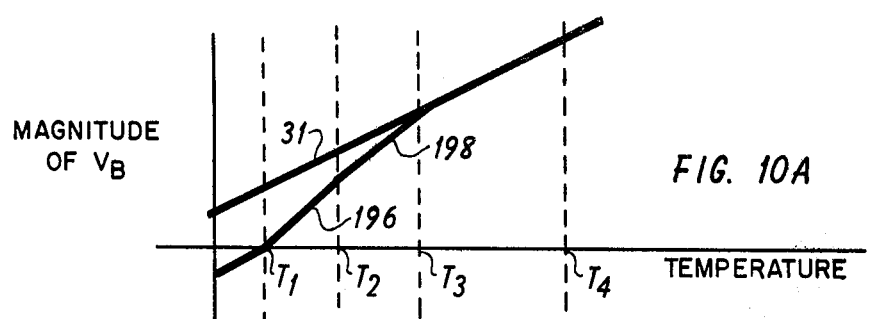
FIGS. 10A–10F are graphs which are useful for explaining and understanding the operation of the circuit shown in FIG. 9.
Figure 10B:
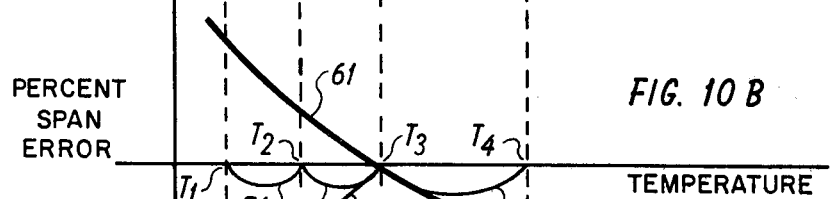
Figure 10C:
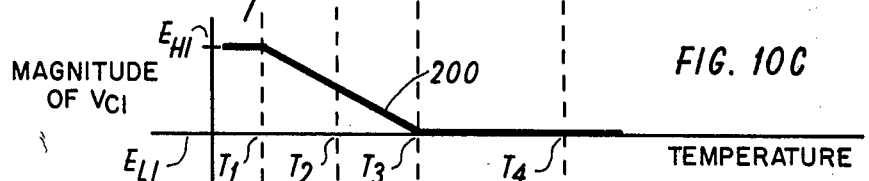
Figure 10D:
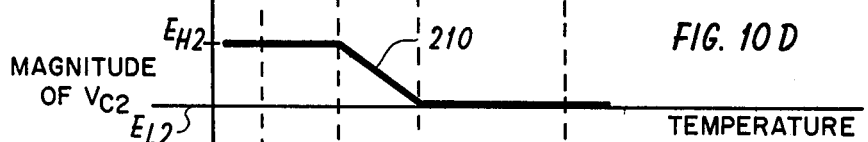
Figure 10E:
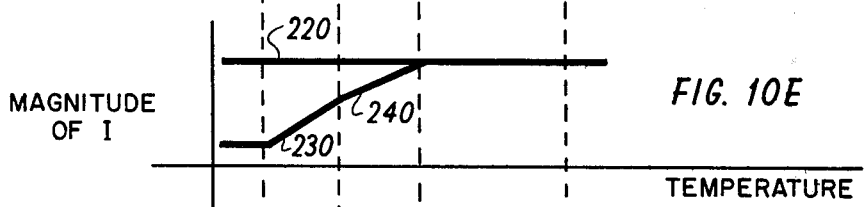

Non-linear feedback circuit 52B includes two feedback circuits 64 and 66 that operate in series with one another to produce lines 70 and 72. Lines 70 and 72 together form a piecewise and discontinuous approximation of an ideal compensation curve for correcting the span errors produced by bridge sensor 40 in the interval between temperatures $T_1$ and $T_3$. The resulting span error when non-linear feedback circuit 52B is interconnected with bridge sensor 40 is depicted by curves 74 and 76. As can be seen in FIG. 10B, lines 70 and 72 have break points occurring at temperatures $T_1$, $T_2$ and $T_3$. These break points are determined by setting the upper saturation levels of operational amplifiers 106 and 108 to occur at temperatures $T_1$ and $T_2$ respectively, and by setting the lower saturation levels thereof to occur at temperature $T_3$.

It should be recalled that bridge voltage $V_B$ varies with temperature and is therefore useful as a temperature signal. Non-linear feedback circuit 52B is coupled to receive bridge voltage $V_B$ and responds thereto for producing signals $V_{C1}$ and $V_{C2}$. The gain of operational amplifier 106 and the voltage level of reference voltage source $E_1$ determine the temperatures (that is, the magnitude of bridge voltage $V_B$ representing such temperatures) at which operational amplifier 106 reaches upper saturation $E_{H1}$ and lower saturation $E_{L1}$. By advantageously choosing the resistances for elements $R_{11}$ and $R_{12}$, the level of upper saturation $E_{H1}$ is set to occur at temperature $T_1$ and the level of lower saturation $E_{L1}$ is set at temperature $T_3$. Signal $V_{C1}$ is applied to the inverting input of operational amplifier 100 via element $R_{15}$ and jumper $L_1$. Similarly, by advantageously choosing the resistances for elements $R_{18}$ and $R_{19}$, the level of upper saturation $E_{H2}$ for operational amplifier 108 is set to occur at temperature $T_2$ and the level of lower saturation $E_{L2}$ is set at temperature $T_3$. The level of lower saturation $E_{L1}$ is set to be essentially zero volts at temperature $T_3$ thereby resulting in the level of lower saturation $E_{L2}$ to become also zero volts at temperature $T_3$. Signal $V_{C2}$ is applied to the non-inverting input of operational amplifier 100 via element $R_{17}$ and jumper $L_4$.

In order for non-linear feedback circuit 52B to produce span error lines 70 and 72, it has been determined by both empirical means and network analysis well known for the circuit shown in FIG. 9 that current I instead of being set at a prescribed level shown by line 220 must be changed as shown by lines 230 and 240. Accordingly, elements $R_{15}$ and $R_{17}$, jumpers $L_1$ and $L_4$, elements $R_7$ and $R_8$, and voltage source $V_T$ are advantageously chosen so that in the interval between temperatures $T_1$ and $T_3$, the magnitude of current I is shown by lines 230 and 240 and the magnitude of bridge voltage $V_B$ is shown by lines 196 and 198.

Figure 11A:
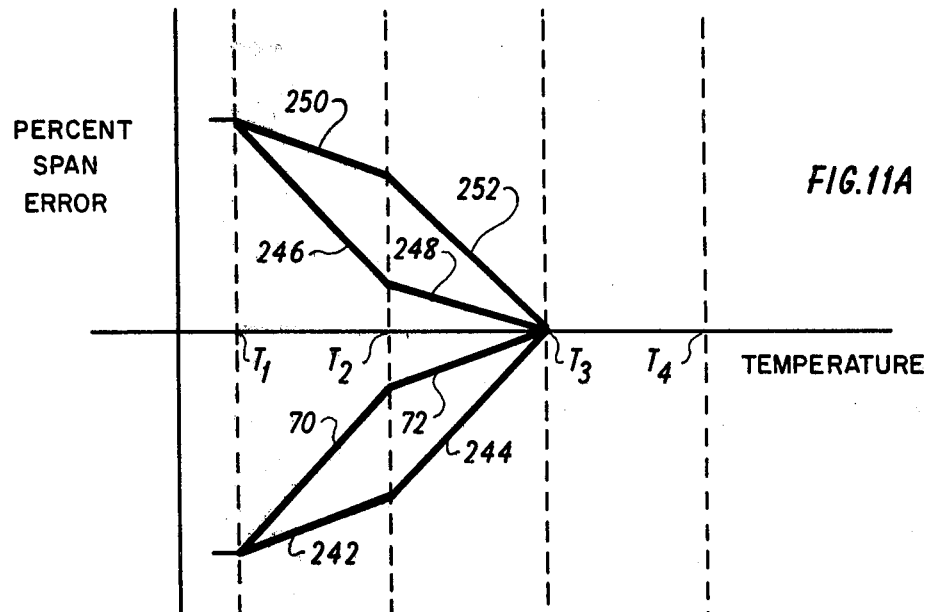
FIGS. 11A and 11B depict graphs which are useful for explaining and understanding the jumper connection arrangements shown in the schematic of FIG. 9.

For other pressure transmitters, the characteristic percent span error curve for the uncompensated sensor may vary positively (instead of the negative variance as shown by line 61) with the temperature and have shapes that are concave or convex with respect to a reference baseline. Accordingly, jumpers $L_1$ through $L_4$ are provided so that the direction of variance and the shape of the percent span error curve which compensates for a particular span error characteristic for the sensor may be produced. With reference to FIG. 11A, lines 70 and 72 have already been discussed. In order to produce percent span error lines 242 and 244, elements $R_{15}$ and $R_{17}$ are both connected to the inverting input of operational amplifier 100 via jumpers $L_1$ and $L_3$ respectively. To produce percent span error lines 246 and 248, element $R_{15}$ is connected to jumper $L_2$ which is joined with node 112 (the non-inverting input of operational amplifier 100) and element $R_{17}$ is connected to jumper $L_3$ which is joined with node 114 (the inverting input of operational amplifier 100). To produce percent span error lines 250 and 252, element $R_{15}$ is connected to jumper $L_2$ and element $R_{17}$ is connected to jumper $L_4$.

Figure 10F:
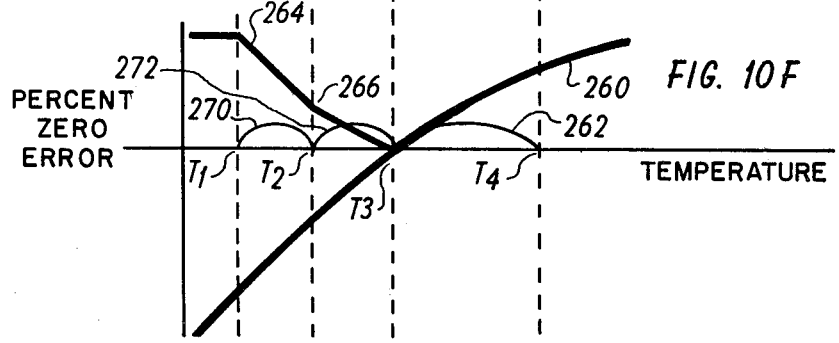

The following discussion will present zero error compensation. As shown in FIG. 9, signals $V_{C1}$ and $V_{C2}$ are also fed forward and applied to zero compensation circuit 56. For the illustrated pressure transmitter, curve 260 shown in FIG. 10F is the percent zero error curve which characterizes sensor 40 when it is operating without any temperature compensation circuitry. The previously described passive resistor network, wherein temperature stable resistors are arranged in series and in parallel with the strain sensitive elements of sensor 40, operates to compensate for zero errors occurring in an interval between temperatures $T_3$ and $T_4$. For that temperature interval, curve 262 is the resulting zero error curve for sensor 40 operating with the passive network. By advantageously selecting the resistances for elements $R_{16}$, $R_{20}$, $R_{38}$ and $R_{39}$ and using jumpers $L_5$ and $L_8$, a piecewise and discontinuous feedback approximation is generated for an ideal compensation curve for correcting the zero errors produced by bridge sensor 40. This approximation represented by lines 264 and 266 substantially compensates for the zero errors occurring in the interval between temperatures $T_1$ and $T_3$ and thereby results in percent zero error curves 270 and 272. It should be noted that curve 260 varies positively with temperature and has a convex shape with respect to the zero base line and that curves 270 and 272 vary negatively and together have a concave shape.

Figure 11B:
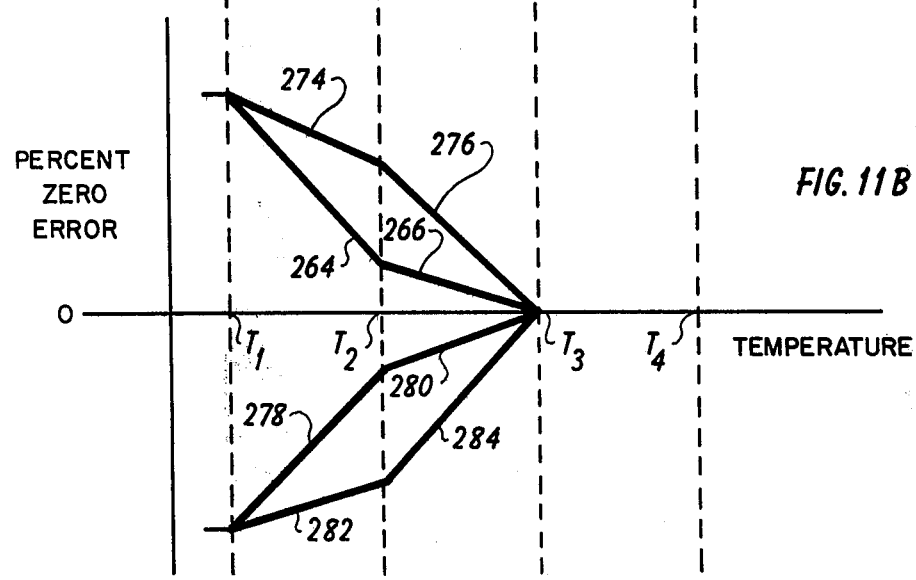

With reference to FIG. 11B, percent zero lines 270 and 272 have already been discussed. To produce lines 274 and 276 so as to compensate for a sensor having a zero error curve which varies positively and has a concave shape, jumpers $L_5$ and $L_7$ are used to connect elements $R_{16}$ and $R_{20}$ to node 130. To produce lines 278 and 280 so as to compensate for a sensor zero error curve which varies negatively with temperature and has a concave shape, jumpers $L_6$ and $L_7$ are used to connect elements $R_{16}$ and $R_{20}$ to nodes 128 and 130 respectively. Finally, to produce lines 282 and 284 so as to compensate for a sensor zero error curve which varies negatively and has a convex shape, jumpers $L_6$ and $L_8$ are used.

While the present invention has been described with reference to a preferred embodiment, it will be apparent that improvements and modifications may be made within the purview of the invention without departing from the true spirit and scope thereof as defined in the appended claims.

I claim:

1. A pressure transmitter of the type including a substrate carrying a plurality of resistors at least one of which has a resistance value varying with changes in strain developed in said substrate so as to provide a measure of the magnitude of the pressure producing such strain; said transmitter comprising:

a resistance network including said one strain-responsive resistor;

said network having input and output circuits;

power supply means coupled to said input circuit of said network to produce a flow of current therein so as to activate said network and develop an output signal in said output circuit responsive to said changes in strain;

temperature sensing means for producing a temperature signal which varies with changes in resistance of said network resulting from changes in temperature thereof;

said output signal having an error which varies in accordance with said temperature changes;

means responsive to said temperature signal including at least first amplifier means coupled to receive said temperature signal, means for saturating the output of said first amplifier means whenever the temperature signal corresponds to temperatures which are respectively less than a first temperature or greater than a second temperature, second amplifier means coupled to receive said temperature signal, and means for saturating the output of said second amplifier means whenever the temperature signal corresponds to temperatures which are respectively less than a third temperature or greater than a fourth temperature;

means for combining the outputs of said first and second amplifier means and producing a discontinuous signal having at least two discontinuous segments which are characterized by break points occurring at said first through fourth temperatures; and means responsive to said discontinuous signal for changing said output signal so that said temperature dependent errors therein are substantially eliminated.

2. The pressure transmitter of claim 1 wherein said temperature sensing means is said network.

3. The pressure transmitter of claim 1 wherein said power supply means further includes a control circuit means and said means responsive to said discontinuous signal generates a discontinuous feedback signal which is applied to said control circuit for altering the output of said power supply means and thereby changing said output signal of the network so that said temperature dependent errors are substantially eliminated.

4. The pressure transmitter of claim 3 wherein said temperature sensing means is said network.

5. The pressure transmitter of claim 3 wherein said first and second amplifier means are connected in parallel arrangement with one another.

6. The pressure transmitter of claim 3 wherein said first and second amplifier means are connected in series arrangement with one another.

7. The pressure transmitter of claim 3 wherein said power supply means includes a differential amplifier having inverting and non-inverting inputs; and said means generating the discontinuous feedback signal includes jumpering means having a cross-connecting field for applying the outputs of said first and second amplifier means in a predetermined combination to said inverting and non-inverting inputs to compensate for said temperature-dependent errors in said output signal.

8. The pressure transmitter of claim 3 wherein said means responsive to said discontinuous signal generates a discontinuous feedforward signal and further includes compensating means operative for combining said feedforward and output signals and thereby producing a pressure representative signal with a zero level substantially independent of said temperature changes.

9. The pressure transmitter of claim 8 wherein said power supply means includes a differential amplifier having inverting and non-inverting inputs; and said means generating the discontinuous feedback signal includes jumpering means having a cross-connecting field for applying the outputs of said first and second amplifier means in a predetermined combination to said inverting and non-inverting inputs to compensate for said temperature dependent errors in said output signal.

10. The pressure transmitter of claim 8 wherein said temperature sensing means is said network.

11. The pressure transmitter of claim 8 wherein said second and fourth temperatures are the same.

12. The pressure transmitter of claim 1 wherein said means responsive to said discontinuous signal generates a discontinuous feedforward signal and further includes compensating means operative for combining said feedforward and output signals and thereby producing a pressure representative signal with a zero level substantially independent of said temperature changes.

13. The pressure transmitter of claim 12 wherein said first and second amplifier means are connected in parallel arrangement with one another.

14. The pressure transmitter of claim 12 wherein said first and second amplifier means are connected in series arrangement with one another.

15. The pressure transmitter of claim 12 wherein said power supply means includes a differential amplifier having inverting and non-inverting inputs; and said means generating the discontinuous feedback signal includes jumpering means having a cross-connecting field for applying the outputs of said first and second amplifier means in a predetermined combination to said inverting and non-inverting inputs to compensate for said temperature-dependent errors in the output signal.

16. The pressure transmitter of claim 12 wherein said temperature sensing means is said network.

17. The pressure transmitter of claim 12 wherein said second and fourth temperatures are the same.

18. In a pressure transmitter of the type including a substrate carrying a plurality of resistors at least one of which varies in resistance with changes in strain of said substrate;

said plurality of resistors comprising a resistance network including said one resistor and having input and output circuits; and a power supply coupled to said input circuit to produce a flow of current in said network so as to develop a strain-responsive signal in said output circuit;

the method of temperature compensating said transmitter comprising the steps of:

developing from a temperature sensor a temperature signal that varies with changes in resistance of said network caused by changes in temperature thereof;

applying said temperature signal to circuit means which includes at least first and second amplifier means;

saturating the output of said first amplifier means whenever the temperature signal corresponds to temperatures which are respectively less than a first temperature or greater than a second temperature;

saturating the output of said second amplifier means whenever the temperature signal corresponds to temperatures which are respectively less than a third temperature of greater than a fourth temperature;

combining the outputs of said first and second amplifier means to produce a discontinuous signal which is characterized by break points occurring at said first through fourth temperatures; and changing said strain-responsive signal in accordance with said discontinuous signal so that temperature-dependent errors in the strain-responsive signal are substantially eliminated.

19. The method as recited in claim 18, wherein said pressure transmitter includes a control circuit which is responsive to a feedback signal and is coupled to said power supply for controlling the output thereof, said method further including the steps of:

generating said feedback signal from said discontinuous signal;

transmitting said feedback signal to said control circuit; and altering the output of said power supply in accordance with a characteristic of said feedback signal so as to produce said strain-responsive signal of the network substantially independent of said temperature changes.

20. The method as recited in claim 18, wherein said pressure transmitter further includes a zero compensation circuit that is coupled to receive the strain-responsive signal to produce a pressure signal, said method further including the steps of:

combining in said zero compensation circuit and discontinuous signal and said strain-responsive signal for producing the pressure signal which has a zero level substantially independent of said temperature changes.

* * * * *